United States Patent
Newman et al.

(10) Patent No.: US 8,145,810 B2
(45) Date of Patent: Mar. 27, 2012

(54) SYSTEM AND METHOD FOR MANAGING COMMUNICATION PORTS ON A COMPUTER DEVICE

(75) Inventors: Nader Newman, Brampton (CA); Anatoly Khazin, Toronto (CA)

(73) Assignee: Psion Teklogix Inc., Mississauga (CA)

( * ) Notice: Subject to any disclaimer, the term of this patent is extended or adjusted under 35 U.S.C. 154(b) by 55 days.

(21) Appl. No.: 11/952,800

(22) Filed: Dec. 7, 2007

(65) Prior Publication Data
US 2009/0150578 A1 Jun. 11, 2009

(51) Int. Cl.
  G06F 13/12 (2006.01)
  G06F 13/38 (2006.01)
(52) U.S. Cl. .......................................... 710/62
(58) Field of Classification Search ...................... 710/62
  See application file for complete search history.

(56) References Cited

U.S. PATENT DOCUMENTS

| | | | |
|---|---|---|---|
| 5,809,329 A | | 9/1998 | Lichtman et al. |
| 5,812,820 A | * | 9/1998 | Loram .............................. 703/20 |
| 6,697,073 B1 | * | 2/2004 | Kadota .......................... 345/501 |
| 6,779,047 B1 | * | 8/2004 | Caddes et al. .................. 710/15 |
| 6,809,830 B1 | * | 10/2004 | Lafky ............................ 358/1.13 |
| 7,251,724 B2 | * | 7/2007 | Kobayashi et al. ............... 713/1 |
| 7,526,536 B2 | * | 4/2009 | Bhogal et al. ................. 709/220 |

\* cited by examiner

Primary Examiner — Chun-Kuan Lee
(74) Attorney, Agent, or Firm — Pearne & Gordon LLP

(57) ABSTRACT

There is provided a system and method for managing communication ports on a computer device. The method comprises the steps of scanning the system file structure, determining port assignments for active devices from a known location in the system file structure, scanning additional locations in the system file structure, determining port assignments for dynamic devices from the additional locations in the system file structure, and displaying the active devices, dynamic devices and the corresponding determined port assignments. The system comprises a memory for storing instructions, and a processor for executing the instructions stored in the memory. The executed instructions generate a system file structure scanner component for scanning the system file structure and generating device data based on the scanned system file structure, a device data structure for storing the device data received from the computer system file structure scanner component, and a port assigner component for assigning communication ports based on the device data structure.

17 Claims, 7 Drawing Sheets

SYSTEM AND METHOD FOR MANAGING COMMUNICATION PORTS ON A COMPUTER DEVICE

TECHNICAL FIELD

The present invention generally relates to computing devices, and more particularly to computing devices having one or more attached peripheral devices.

BACKGROUND

Computer devices commonly connect to peripheral devices. Although referred to as a peripheral device, the device may form part of the physical computing device, for example a computing device may include an image capture device or other hardware within the case of the computing device. These peripheral devices communicate with applications through a port having a specific interface (a port interface) using a driver.

The driver establishes a communication port (COM port) that applications may connect to and exchange data through. Drivers may specify a particular COM port to communicate through, or may specify a range of COM ports it can communicate through.

A specific piece of hardware connected to the peripheral interface will typically have an application associated with it. This application may provide user functionality, such as collecting information using a barcode scanner, or it may provide an application programming interface (API) to other applications. The device API provides various functions for communicating with the device. Regardless of the type of application, it will typically communicate with the interface device driver through a COM port.

The application and the driver must be able to function with the same COM port. For example, if the driver is assigned COM port 3, then any application that communicates with the device connected to this interface must be designed to be able to communicate with a device using COM port 3.

Computing devices may have multiple interfaces, as well as multiple applications, that communicate with different devices connected to the various interfaces. Due to the requirements of COM port communication, it is often difficult to properly assign COM ports to interfaces such that all applications will function properly.

Various applications have attempted to alleviate some of the problems associated with COM ports. These include, for example, applications that allow for COM ports associated with an interface driver to be associated with virtual COM ports that an application can communicate through. Further applications have provided the ability to remap COM ports, for example mapping COM port 1 to COM port 6. Still further applications may allow for viewing and modifying the properties associated with a particular interface, such as the COM port assigned to the interface.

These applications do not provide a simple means of assigning all COM ports to interfaces and devices for a computer device. A need therefore exists to provide a simpler means of assigning COM ports to interfaces and devices for a computing device.

SUMMARY

In accordance with one aspect of the present invention there is provided a method for managing communication ports on a computer device having a system file structure. The method comprises the steps of scanning the system file structure, determining port assignments for active devices from a known location in the system file structure, scanning additional locations in the system file structure, determining port assignments for dynamic devices from the additional locations in the system file structure, and displaying the active devices, dynamic devices and the corresponding determined port assignments.

It is within the scope of the COM port manager to have only a single active device and/or a single dynamic device. It should be understood that the terms active devices and dynamic devices also encompass a single active device and a single dynamic device.

In accordance with one aspect of the present invention there is further provided a system for managing communication ports on a computer device having a system file structure. The system comprises a memory for storing instructions, and a processor for executing the instructions stored in the memory. The executed instructions generate a system file structure scanner component for scanning the system file structure and generating device data based on the scanned system file structure, a device data structure for storing the device data received from the computer system file structure scanner component, and a port assigner component for assigning communication ports based on the device data structure.

In accordance with one aspect of the present invention there is further provided a computer-readable medium storing instructions or statements for use in the execution in a computer of a method for managing communication ports on a computer device having a system file structure. The method comprises the steps of scanning the system file structure, determining port assignments for active devices from a known location in the system file structure, scanning additional locations in the system file structure, determining port assignments for dynamic devices from the additional locations in the system file structure, and displaying the active devices, dynamic devices and the corresponding determined port assignments.

In accordance with one aspect of the present invention there is further provided a propagated signal carrier carrying signals containing computer-executable instructions that can be read and executed by a computer, the computer-executable instructions being used to execute a method for managing communication ports on a computer device having a system file structure. The method comprises the steps of scanning the system file structure, determining port assignments for active devices from a known location in the system file structure, scanning additional locations in the system file structure, determining port assignments for dynamic devices from the additional locations in the system file structure, and displaying the active devices, dynamic devices and the corresponding determined port assignments.

BRIEF DESCRIPTION OF THE DRAWINGS

Illustrative embodiments of the invention will now be described with reference to the following drawings in which.

DETAILED DESCRIPTION

With the flexibility of computing devices for adding multiple hardware modules that use and/or expose COM ports, the handling and management of the COM port assignments can become overwhelming. Without the use of a COM port manager as described herein, it is difficult to determine what COM ports are available when particular peripheral devices are added, or connected, to the computing device. With the use of a COM port manager as described herein, it is possible to know what COM ports are free, and control the assignment of the ports as appropriate.

Figure 1:
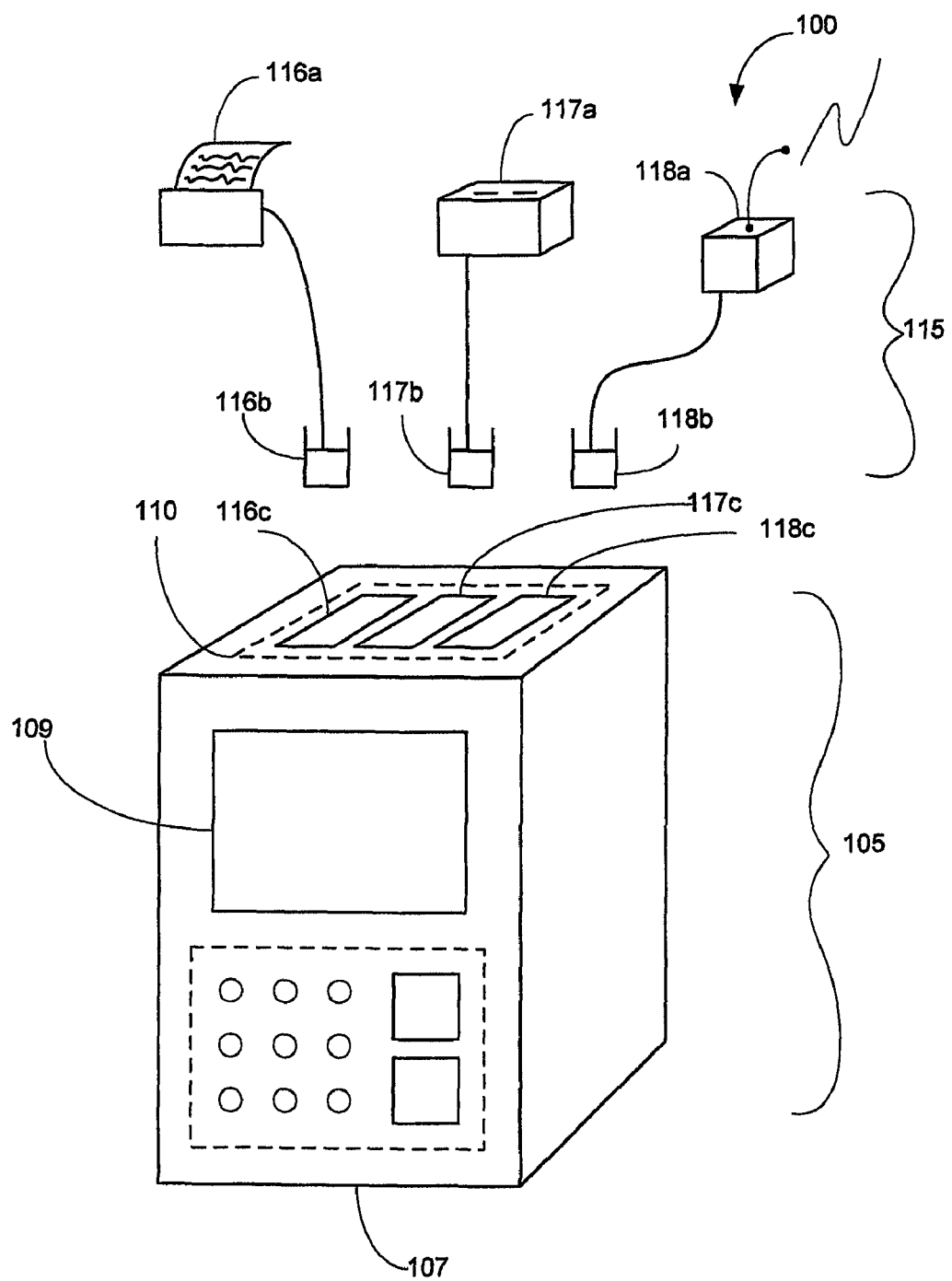
FIG. 1 depicts in a diagram an illustrative example of a system in accordance with the COM port manager.

FIG. 1 depicts, in a diagram, an illustrative example of a system in accordance with a COM port manager. The system 100 comprises a computing device 105. The computing device is described herein as a handheld computer, however, one skilled in the art will appreciate that the COM port manager is not limited to use with handheld computers, and could be easily used with other computing devices such as, for example, a laptop, a desktop computer, a personal digital assistant (PDA), a PDA type device, smart phone etc.

The handheld computer 105 comprises an input device 107 for inputting information into the handheld computer 105. The input device 107 may be a QWERTY type keyboard, however, one skilled in the art will appreciate that the input device 107 does not need to be a QWERTY keyboard. For example, the input device 107 may comprise a handwriting recognition device, a limited keyboard, keys, a mouse, a trackball, a voice recognition device, a touch sensitive screen, etc.

The handheld computer 105 further comprises an output device 109 for presenting information to a device user. The output device 109 is described herein as a display screen, however, one skilled in the art will appreciate that the output device 109 may be any suitable device for allowing output of information. For example, the output device 109 may comprise a speaker, a Braille device, light emitting diodes (LEDs), lights, etc.

The handled computer 105 further comprises various port interfaces 110. The handheld computer 105 may have only a single port interface, or it may have more than one port interface. The handheld computer 105 of FIG. 1 is shown as having 3 port interfaces 116c, 117c and 118c. The port interfaces 116c, 117c, 118c are described herein as being different port interfaces, however, one skilled in the art will appreciate that the individual port interfaces 116c, 117c, 118c do not need to be different and may be the same.

The system 100 further comprises peripheral devices 115. The peripheral devices 115 connect to the handheld computer 105 via the port interfaces 110. As outlined above, although shown as being connected to an external port interface, the devices may be internal to the device. The physical connector for an internal peripheral device may not provide easy connection and disconnection of the internal peripheral device due to size requirements, however, from the point of software or other hardware running on the handheld computer 105, the internal peripheral device functions the same as an external peripheral device.

The peripheral devices 115 may comprise various hardware components or modules. For example, peripheral device 116a may be a printer. Peripheral device 116a connects to the port interface 116c using an appropriate physical connector 116b. Peripheral device 117a is shown as an expansion module for providing additional port interfaces for connecting further devices. Peripheral device 117a connects to the port interface 117c using an appropriate physical connector 117b. Peripheral device 118a is shown as a Bluetooth™ radio for connecting to Bluetooth™ devices. The Bluetooth™ radio connects to port interface 118c using an appropriate connector 118b.

Figure 2:
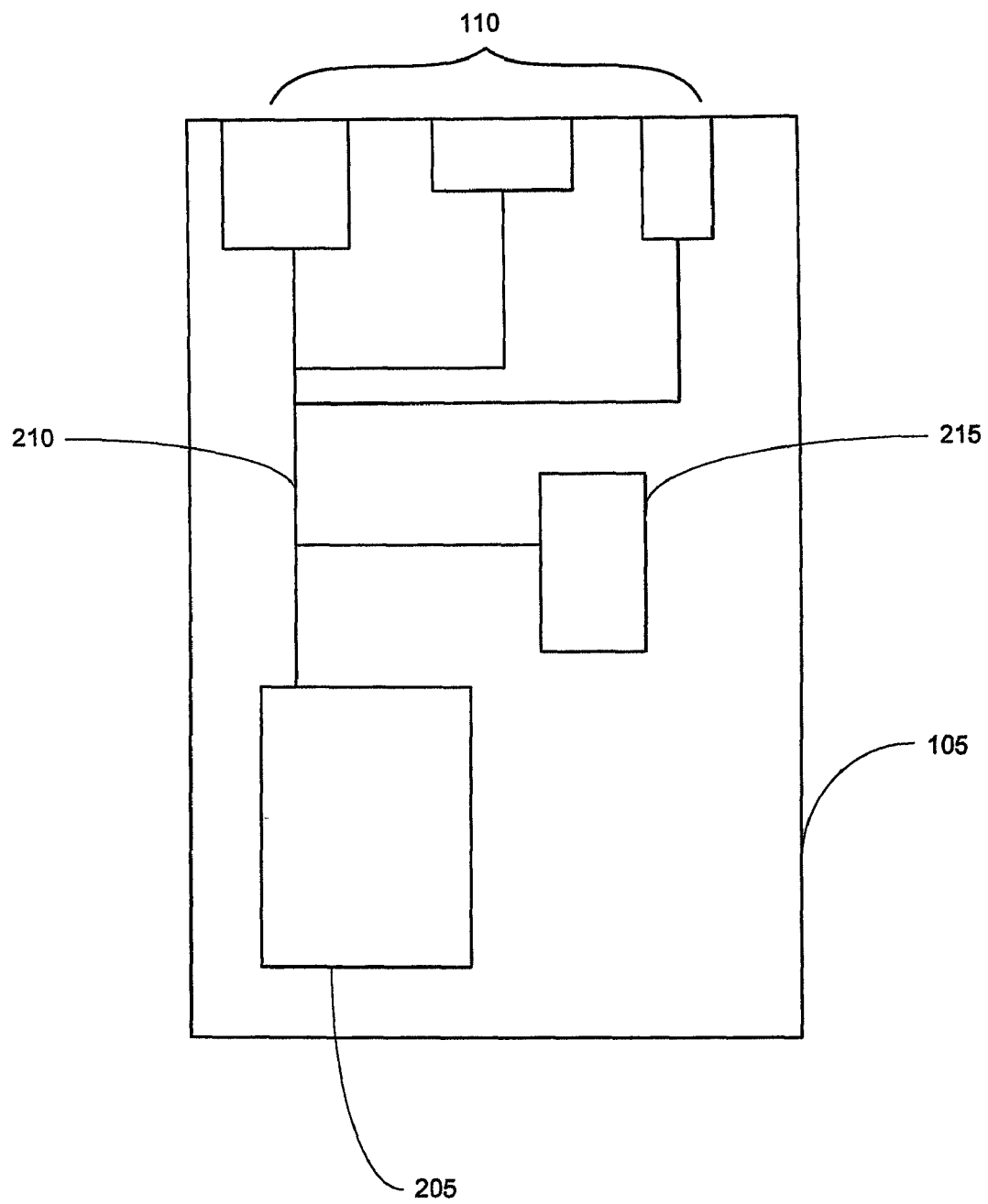
FIGS. 2 shows in a functional schematic, further components of an illustrative handheld computer in accordance with the COM port manager.

FIG. 2 shows, in an illustrative functional schematic, further components of the handheld computer 105. The handheld computer 105 may comprise a processor 205 for executing instructions stored in a memory 215 that the processor 205 is connected to. The processor 205 is also connected to the port interfaces 110 through a bus 210. One skilled in the art will appreciate that multiple port interfaces may communicate with the processor 205 using multiple buses. Instructions stored in memory 215 may control the communication between the processor 205 and the port interfaces 110 to allow peripheral devices 115 connected to the various port interfaces 110 to communicate with the processor 205. The memory 215 may also store further instructions for providing the functionality of the COM port manager as well as, for example, an operating system and applications.

The port interfaces 110 may be classified as a fixed device port interface, or a dynamic device port interface. The COM port manager may optionally detect and display devices connected to fixed device port interfaces. If no devices are connected to a fixed device port interface, then the COM port manager optionally does not display the COM port assignments for the fixed device port interface. The COM port manager may always show the COM port assignments for dynamic device port interfaces, regardless of if a peripheral device is actually connected to the dynamic port interface. A fixed device port interface may also be further classified as an unchangeable device. An unchangeable device has a detected COM port assignment that cannot be changed.

COM port manager can be used with various port interfaces, devices and applications. Specific illustrative port interfaces that may be found on a handheld computer are set forth below. One skilled in the art will appreciate that the system and methods of a COM port manager are not limited to use with only these port interfaces. The port interfaces and devices of the handheld computer 105 that may require a COM port be assigned may include for example:

CompactFlash™ CF Slot (CF): Provides a CompactFlash™ device port interface;

XMod (XMod): Provides a device port interface for expansion board modules (for example personal computer memory card international association (PCMCIA));

Bluetooth™ (BT): Provides Bluetooth™ radio device port interface;

BlackRoc with infrared (IR) capabilities (BR0): provides an infrared (IR) device port interface;

BlackRoc with RS232 capabilities (BR1): provides an RS232 device port interface;

BlackRoc with transistor-transistor logic (TTL) capabilities (BR2): provides a TTL device port interface;

BlackRoc with IR/RS232/TTL (BR3): provides an IR device port interface, an RS232 device port interface and an TTL device port interface;

Port Replicator (PREP): provides multiple port interfaces (for example 3 serial communication device port interfaces);

Universal serial bus (USB™) serial dongle (USB™S): provides a serial device port interface (for example a DB9M connector) connected to a USB™ port interface or bus;

USB™ ActiveSync™ (USB™AS): provides a COM port assigned for active synching of the handheld computer 105 with a host computer (not shown) via USB™ port interface or bus;

Scanner (SCAN): provides a COM port assignment for an internal scanner of the handheld computer 105;

Infrared communications protocol (IRCOMM): provides a COM port assignment for IRCOMM stack driver; and Virtual port (VP): provides COM port assignments for virtual ports.

Table 1, below, provides an illustrative default COM port assignment matrix for the various COM ports and port interfaces. Table 1 also indicates the classification as fixed (F), dynamic (D), and unchangeable (U).

The various COM port assignments are typically stored in an operating system file structure. For example, if the operating system is a Microsoft Windows™ operating system (for example Windows CE™) then the data structure may be the system registry. The system registry stores information pertaining to the COM port assignments of active peripheral devices (i.e. peripheral devices that are connected to a port interface and enabled). The registry entries associated with active peripheral devices may also indicate the appropriate drivers for the peripheral device. The system registry may also store information about peripheral devices that are not currently connected. For example driver information can be stored in the system registry so that when an associated peripheral device is connected to the handheld computer, the appropriate driver is able to be loaded.

Figure 3:
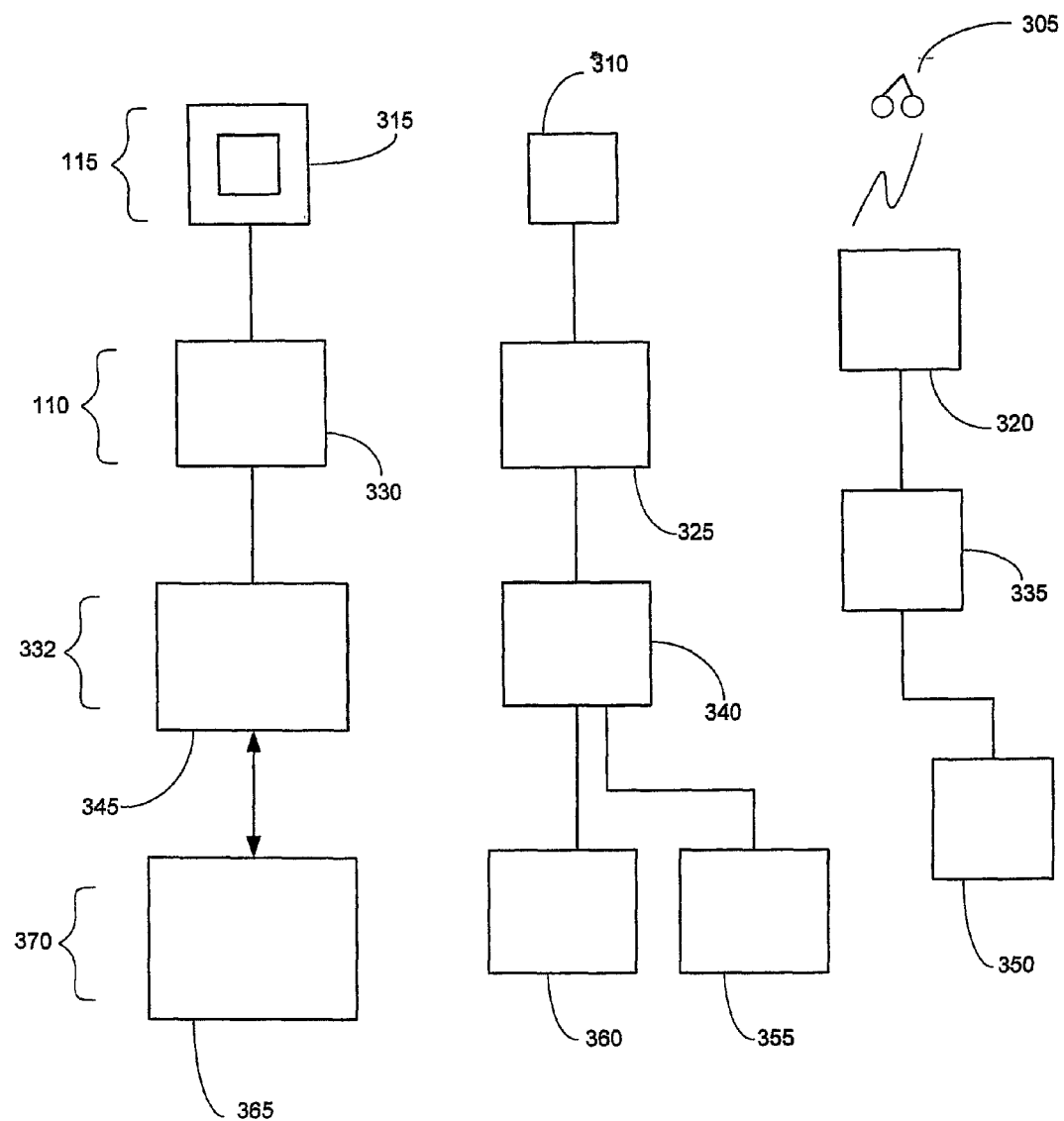
FIG. 3 shows in a logical schematic an illustrative association of components of a system in accordance with the COM port manager.

FIG. 3 shows, in an illustrative logical schematic, the association of components of a system in accordance with the

TABLE 1

COM port assignment matrix

| Classification | | COM1 | COM2 | COM3 | COM4 | COM5 | COM6 | COM7 | COM8 | COM9 | COM0 |
|---|---|---|---|---|---|---|---|---|---|---|---|
| F | CF | | | | | | | | | | |
| F | XMod | X | | | | | | | | | |
| FU/ F(external connections) | BT | | X | | | | | | | | |
| F | BR0 | | | | | | | | | | X |
| F | BR1 | X | | | | | | | | | |
| F | BR2 | | | | | | | | X | | |
| F | BR3 | X | | | | | | | X | | X |
| D | PREP | | | | | X | X | X | | | |
| D | USB™S | | | | | X | | | | | |
| FU | USB™AS | | | | X | | | | | | |
| FU | SCAN | | | X | | | | | | | |
| FU | IRCOMM | | | | | | | | | X | |
| D | Virtual Port | | | | | | | | X | | |

With respect to Table 1, it is to be understood that the table may not represent peripheral devices that are connected to a handheld computer simultaneously. For example, a handheld computer would typically not have BR0 and BR3 connected at the same time since BR3 provides the functionality of BR0 (i.e. an IR interface). Furthermore, BT, BR3 and PREP are shown as having multiple COM port assignments. For BT, COM port assignment COM1 may be assigned to the Bluetooth™ device port interface (i.e. the Bluetooth™ radio) while the additional COM port assignments (COM7, COM8, COM9) may be assigned to various external connections to Bluetooth™ devices (for example a Bluetooth™ headset, a Bluetooth™ printer and a Bluetooth™ smart phone). For BR3, the 3 COM port assignments are necessary since BR3 provides 3 port interfaces (IR/RS232/TTL) and each one requires a COM port assignment. Similarly, PREP provides a port replicator which provides for multiple ports, each of which requires a COM port assignment. The information regarding the required port assignments for the various peripheral devices may be retrieved by the COM port manager from a system registry. Alternatively, or additionally, the COM port manager may be provided with this information through hard coding it into the COM port manager logic, or by accessing files that store the information, with the location of the files being hard coded into the COM port manager, or set as an option.

Table 1 indicates that if all of the COM port assignments were used simultaneously by the handheld computer, various conflicts would arise, for example XMOD, BR1 and/or BR3 would conflict (COM1).

COM port manager. The system comprises various peripheral devices 115 connected to port interfaces 110. The port interfaces 110 have an associated driver (eg. APIs) 332 for providing basic communication to the connected peripheral devices 115 using the particular port interfaces 110. The system also comprises various applications 370 for communicating with the peripheral devices 115 through the port interfaces 110. One skilled in the art will appreciate that the applications 370 may be a consumer application with a graphical user interface for interacting with the peripheral devices. Additionally or alternatively the applications 370 may provide peripheral device application programming interfaces (APIs) to the connected peripheral devices that other applications can make use of for communicating with the connected peripheral devices 115.

The system of FIG. 3 depicts an illustrative embodiment of various peripheral devices connected to the handheld computer 105. The peripheral devices 115 comprise a custom fingerprint reader hardware module 315, connected to the handheld computer 105 using a hardware expansion port interface 330. The peripheral devices further comprise a CompactFlash™ global positioning system (GPS) radio module 310 connected to the handheld computer using a CF slot port interface 325. The peripheral devices further comprise a Bluetooth™ headset 305 connected to the handheld computer 105 using a Bluetooth™ radio port interface 320.

The port interfaces 110 (330, 325, 320) have an associated interface driver 332 (345, 340, 335). The interface driver may include a device driver. For example, the Bluetooth™ interface driver 335 may comprise the logic necessary for communicating using the Bluetooth™ radio port interface as well as device logic for communicating with the particular Bluetooth™ headset 305 using the Bluetooth™ radio port interface. Likewise the interface driver 340 for the CF GPS radio may comprise both logic for communicating over the CF port interface and logic for communicating with the GPS device.

The hardware expansion port interface driver 345 may only comprise logic for communicating with the device using the hardware expansion port interface. It may not provide an API for communicating with the fingerprint reader. The application that communicates with the fingerprint reader may provide an API (or device driver) to other applications.

FIG. 3 depicts various applications 350, 355, 360, 365. Application 1 365 may be a device driver for the fingerprint reader 315. Application 1 365 may provide a device API that can be used by other applications that communicate with the fingerprint reader. For example, the fingerprint reader application may comprise functions for capturing a fingerprint, registering the fingerprint as a known fingerprint and validating a captured fingerprint against known fingerprints. An application may then use this application to provide fingerprint security, without requiring knowledge of the specific hardware expansion port interface driver logic.

Application 2 360 may utilize the CF GPS receiver to provide a map indicating the position of the handheld computer. Application 3 355 may also use the CF GPS receiver, but it may use the CF GPS receiver to provide the amount of distance the handheld computer has traveled in a day.

Application 4 350 may provide a music player that streams music to the Bluetooth™ wireless headset.

Each of the applications 370 communicate with the peripheral devices through a COM port. The applications may be designed to use different COM ports, and the COM ports must not have conflicts. Table 2 below indicates possible COM ports that the applications may be designed to work with.

Bluetooth™ radio) and COM7 (for the external Bluetooth™ connection to the headset.

The COM port manager provides a method that can allow for the COM port assignments to be determined such that applications will function properly and there won't be COM port conflicts. This can be used advantageously to provide COM port assignments for handheld computers that have peripheral devices that may be connected and disconnected. The COM port manager provides a method for ensuring that an efficient COM port assignment is used.

As an example, if the handheld computer has two peripheral devices that can be connected and disconnected periodically, and the first peripheral device may communicate using any available COM port, while the second peripheral device may only communicate using COM1, if the first peripheral device is connected before the second peripheral device, it may utilize the first available COM port (COM1). This would result in the second peripheral device being unusable, since the only COM port it can use is already in use. The COM port manager can be used to specify that first peripheral device should use the first available COM port after COM1. This results in COM1 being free for use by the second peripheral device regardless of if the first peripheral device was connected prior to the second peripheral device.

Figure 4B:
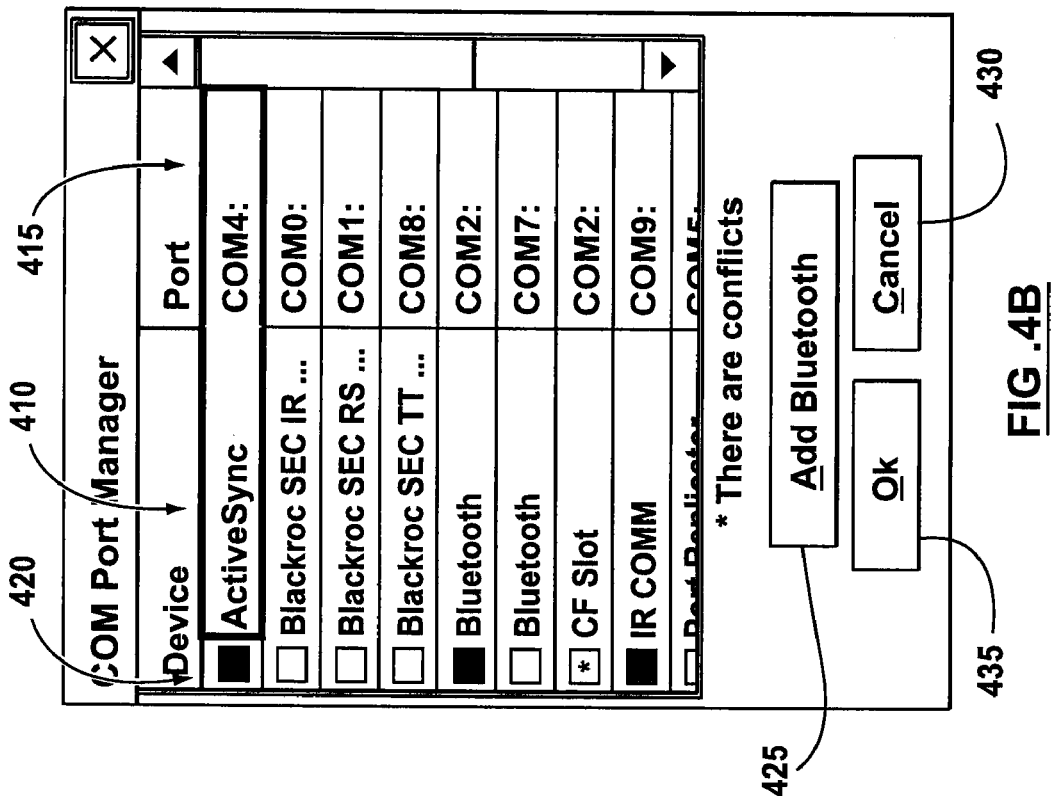
FIGS. 4a-d show in schematics various illustrative screens in accordance with the COM port manager.
Figure 4A:
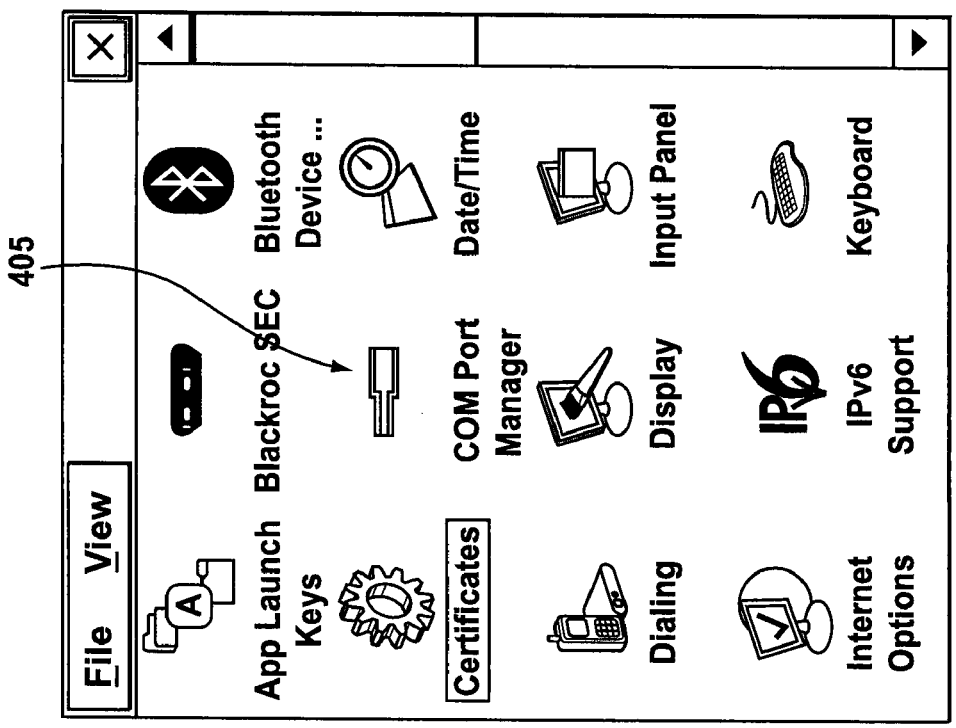

FIGS. 4a-d show in schematics various screens that may be displayed by the COM port manager in order to provide the management of the COM port assignments. FIG. 4a depicts a control panel including an icon 405 for starting the COM port manager application or component. FIG. 4b depicts a screen of the COM port manager. The screen comprises a list of devices 410 (port interfaces) and their associated COM port assignment 415. The list may also comprise an icon 420 associated with each device. The icon represents a COM port assignment. For example, the icon may indicate that the COM port assignment is changeable and has no conflicts (for example an invisible icon). The icon may also represent that

| Application | COM1 | COM2 | COM3 | COM4 | COM5 | COM6 | COM7 | COM8 | COM9 | COM0 |
|---|---|---|---|---|---|---|---|---|---|---|
| App1 | X | | | X | | | | | | |
| App2 | | | | X | X | | | | | |
| App3 | | X | X | | X | X | | | | |
| App4 | | X | | | | | X | X | X | |

Application 4 utilizes the Bluetooth™ radio which may require COM2. The application also requires an additional COM port for establishing an external with the device over the Bluetooth™ radio. This may be any one of COM7, COM8 or COM9. Application 1 may communicate with the fingerprint reader using either COM1 or COM4. Application 2 and application 3 both utilize the CF GPS receiver which will have an associated COM port. As a result, in order for both applications to work with the CF GPS receiver without requiring COM ports to be reassigned when using the different applications, the COM port should be assigned a COM port that both applications can communicate with.

The above application COM port restrictions may be used to determine a possible COM port assignment, as set forth below:
  Application 1 communicates with the fingerprint reader over the hardware expansion port interface using COM1;
  Applications 2 and 3 communicate with the CF GPS receiver over the CF port interface using COM5; and
  Application 4 communicates with the headset over the Bluetooth™ radio port interface using COM2 (for the the COM port assignment is unchangeable and has no conflicts (for example a black square). The icon may also indicate that the COM port assignment is changeable and has conflicts (an asterisk). The icon may further indicate that the COM port assignment is unchangeable and has conflicts (an asterisk on a black square).

Figure 4D:
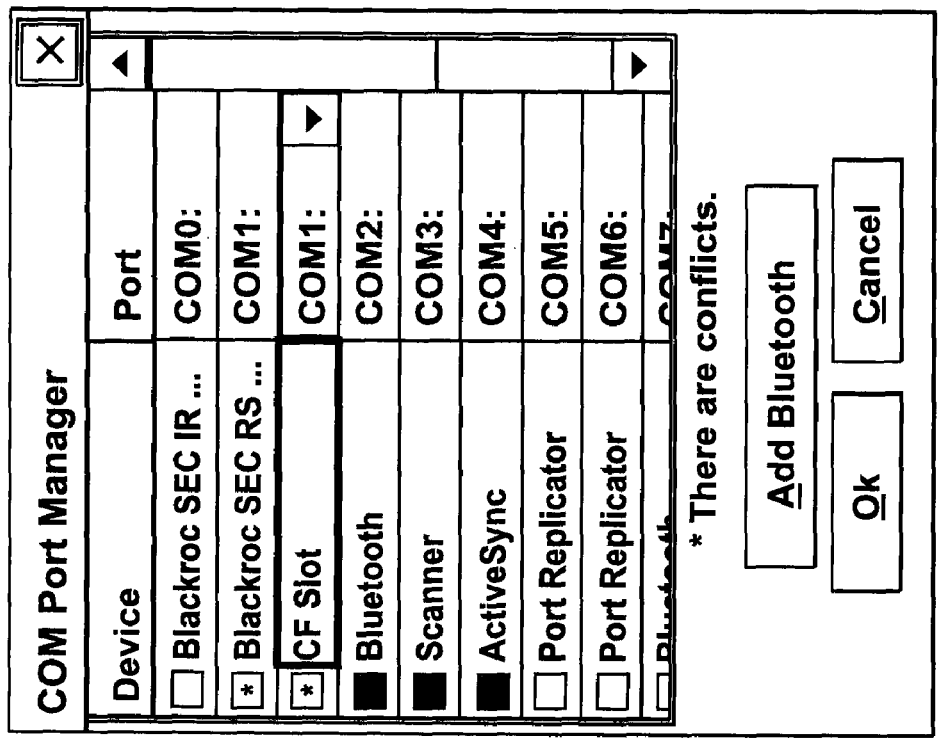
Figure 4C:
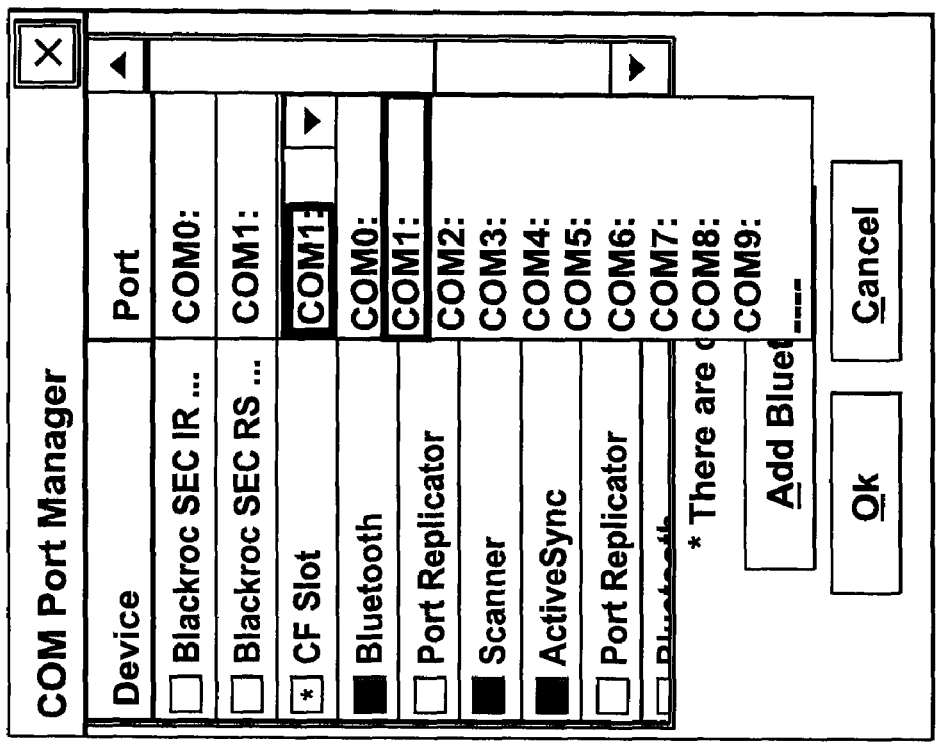

FIG. 4c shows a screen that allows for the re-assignment of the COM port for the CF slot. FIG. 4c indicates a COM port assignment of COM1 being selected. FIG. 4D shows a screen of the COM port manager after the COM port for the CF slot has been reassigned to COM1. FIG. 4d indicates that the modified COM port assignment of the CF slot now conflicts with the BlackRoc RS232 device. Although it may be desirable to provide a COM port assignment that does not have any conflicts, this assignment may be acceptable. For example in use, the handheld computer may not have both the BlackRoc RS232 device and a CF slot device connected at the same time, so they may use the same COM port assignment.

The screens of FIGS. 4b-d also comprise an add Bluetooth™ button 425 which can be used to add a COM port assignment for a Bluetooth™ external connection for a peripheral device that is not shown. The screen also has a cancel button 430. The cancel button 430 will exit the COM port manager without saving any of the COM port assignments made. An OK button 435 can be used to save the COM port assignments and exit.

The COM port manager may have a selectable option that requires the COM port assignment to be conflict free. This is the preferable (but not essential) situation since all peripheral devices may be connected to the handheld computer without requiring re-assignment of COM ports. However, this may not be possible to achieve, for example if two devices that communicate over a different port interface are designed to only communicate over the same COM port. One skilled in the art will understand that with multiple peripheral devices that can each communicate over a particular range or group of COM ports unresolvable conflicts may be created.

Figure 5:
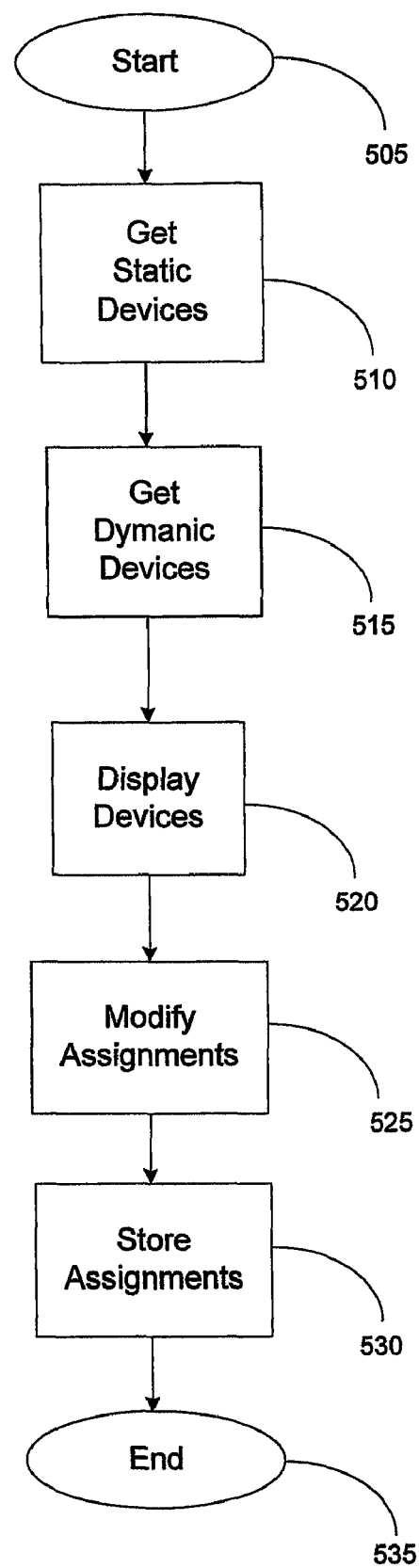
FIG. 5 depicts in a flow chart an illustrative method of managing the COM port assignments, in accordance with the COM port manager.

FIG. 5 depicts, in an illustrative flow chart, a method of managing the COM port assignments. The method begins at step 505 when the COM port manager is started. At step 510 the COM port manager gets the static devices, at step 515 the COM port manager gets the dynamic devices. Once the COM port manager has retrieved the devices (and the associated COM port assignments), the COM port manager displays the devices and the COM port assignments in a list (520). The COM port manager may also add an appropriate icon for each device in the list (i.e. changeable no conflicts, unchangeable no conflicts, changeable conflicts, and unchangeable conflicts). Once the devices and COM port assignments are displayed, the COM port manager may accept an indication of a modification to the COM port assignment at step 525. At step 530 the COM port manager stores the new COM port assignment and exits (535).

Static devices are always present in the handheld computer, and can have peripheral devices attached/detached without requiring the handheld computer to be turned off, or restarted. Static devices may include for example, the CF slot port interface, the Bluetooth™ port interface, the port replicator/USB™ serial dongle and the port assigned for ActiveSync™ via USBT™.

Dynamic devices are displayed by the COM port manager only when a connected peripheral device was detected when the COM port manager was started. Dynamic devices may include, for example, an expansion port interface (for example connecting to global system for mobile communications (GSM) radio, connecting to BlackRoc devices, connecting to PCMCIA devices), a hardware expansion port interface (for example connecting to a custom hardware device), a Virtual Port, and an IRCOMM device.

As described above, the COM port manager can be used to list peripheral devices as they are added or removed, list the COM ports used by peripheral devices as they are added or removed, list devices that do no allow the COM port assignment to be changed, change the COM port assignment to a specific port number or to a defined range for peripheral devices, recalculate COM port assignments to automatically resolve port conflicts, and save the new COM port assignments. The stored COM port assignments may take effect once the handheld computer is restarted.

If the COM port manager ensures that no conflicts exist in the COM port assignment, it may be necessary to disable, or not assign COM ports, to certain devices. This can be achieved by setting the COM port assignment to '–" or another value indicative that the device should not be assigned a COM port. When a device is not assigned a port number, the COM port manager may set a flag indicating that the corresponding driver to prevent the driver from loading. For example, the COM port manager may set a DEVFLAGS_NOLOAD bit in a driver flag to indicate that the driver should not be loaded.

In order for all devices to function properly with the COM port manager, and to achieve maximum flexibility when assigning COM ports, some peripheral devices and associated drivers may be required to be modified to store the COM port assignments in the device registry. For example, most Bluetooth™ devices currently have the COM ports they can communicate using hard coded. The drivers and the devices should be modified to store (and access) this information from the system registry. For example when a Bluetooth™ device connects to the Bluetooth™ port interface, the Bluetooth™driver is hard coded to, for example, get the first free COM port in the range of 7 -9. The driver could be modified to get the first free COM port specified in a Port list. The port list may be stored in the registry as a registry sub key of the Bluetooth™ driver. For example the driver could be modified to retrieve the port list from a registry sub key such as:

HKEY_LOCAL_MACHINE\softare\Microsoft\Bluetooth ™
"PortList"=multi_sz:"5","6","7","8","9"

The Bluetooth™ driver would then assign the first free port from the port list (i.e. COM5-9). The COM port manager may then read and modify the PortList subkey value as appropriate.

For a handheld computer having a CF card slot, the system registry typically does not have a pre-defined COM port assignment associated with the CF card slot, but instead looks for the first free COM port when a CF device is connected to the CF port interface. This may cause problems if the CF device requires a COM port that is not the first free COM port. The CF card slot driver may be modified to get the COM port assignment from a device registry key, when a CF device is connected. A CF slot will typically only allow a single device to be connected at a time, and so the registry key may use an Index value instead of a PortList, as done for the Bluetooth™ devices, which may have multiple devices connected.

The COM port manager may then retrieve and modify this COM port assignment information from the registry, for example from the entry:

HKEY_LOCAL_MACHINE\Drivers\PCMCIA\Serial
"prefix"="COM"
"Index"=dword:1

If the handheld computer comprises an expansion port interface, the COM port manager should determine the dynamic peripheral device that is connected to the port interface. This may be done by looking in the registry to:

HKEY_LOCAL_MACHINE\Drivers\Active for entries with "Drivers\ExampleHandHeldDevice\Expansion Slot" content, for example. If the entry is present then a reference key to the appropriate device driver is obtained, and the COM port assignment is determined from the driver's registry entry. The COM port manager may similarly modify the COM port assignment for devices connected to the expansion slot.

For Example, BlackRoc devices may be connected to an expansion slot port interface. When it is the [HKLM]\Drivers\Active will comprise content pointing to a BlackRoc Driver registry key. The BlackRoc registry key stores the COM port assignments that can be retrieved and modified by the COM port manager. BlackRoc devices may for example store driver information in the following registry keys:

HKEY_LOCAL_MACHINE\Drivers\Blackroc\SEC\IR (for IR multi)
HKEY_LOCAL_MACHINE\Drivers\Blackroc\SEC\TTL (for TTL multi)
HKEY_LOCAL_MACHINE\Drivers\Blackroc\SEC\RS232 (For RS232 multi or standalone)
HKEY_LOCAL_MACHINE\Drivers\Blackroc\SEC\FFUARTIR (for IR standalone)
HKEY_LOCAL_MACHINE\Drivers\Blackroc\SEC\FFUARTTTL (for standalone TTL)

If the handheld computer comprises a GSM radio or GPRS radio the COM port assignment may be retrieved and stored in the registry key:

HKEY_LOCAL_MACHINE\Drivers\ExampleHandHeldDevice\SerialGSM
    "prefix"="COM"
    "Index"=dword:1

If the handheld computer comprises a hardware expansion slot the COM port assignment may be retrieved and stored in the registry key:

HKEY_LOCAL_MACHINE\Drivers\ExampleHandHeldDevice\HardwareExpansion
    "prefix"="COM"
    "Index"=dword:1 and the device name may be read from the connected device, for example from EEPROM.

The registry keys described above are for an illustrative handheld computer, and are intended as examples for describing the functioning of the COM port manager. The COM port manager is designed to function with a specific handheld computer so that it is possible to know the port interfaces available for connecting devices to, as well as the location that COM port assignments are stored in the system registry for the various peripheral devices. One skilled in the art will appreciate that the COM port manager described above can be modified to be used with various computing devices other than a handheld computer. Furthermore the system file structure need not be a system registry, provided the COM port manager knows the location of necessary information.

Figure 6:
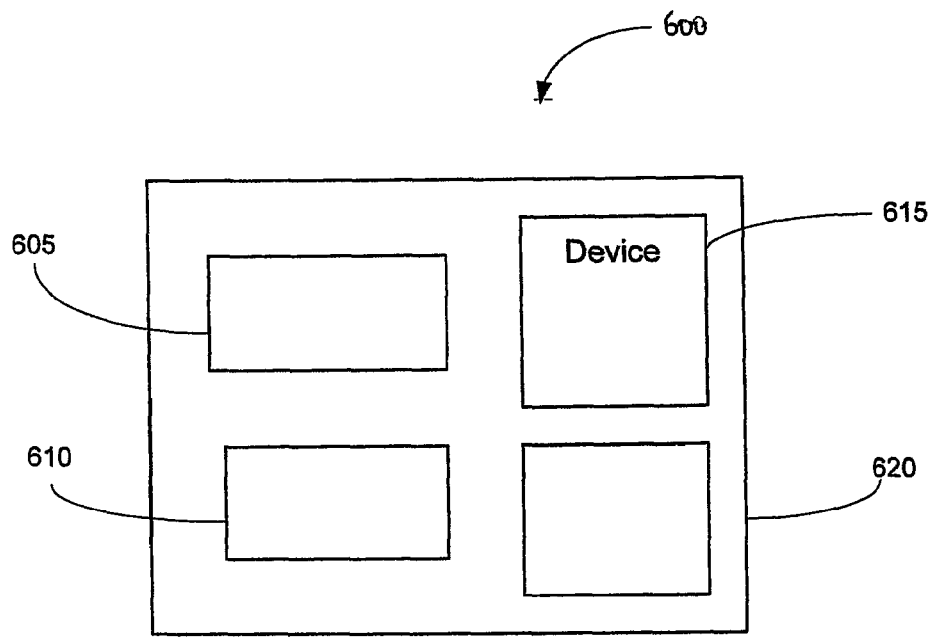
FIG. 6 depicts in a schematic illustrative functional components of a COM port manager.

FIG. 6 depicts, in an illustrative schematic, the functional components of a COM port manager in accordance with the present description. The functional components of the COM port manager may be implemented by the processor by executing instructions stored in the memory of the handheld computer. The COM port manager 600 comprises a registry scanner component 605 for scanning the registry for static and dynamic devices. The registry scanning component may also include logic for scanning additional file locations to determine the possible COM port assignment requirements. The COM port manager 600 may further comprise a port assigner component 610. The port assigner component 610 may determine the COM port assignment for the devices based on the COM port assignment requirements determined by the registry scanning component, and store the COM port assignment to the registry. The COM port manager may further include input and output (I/O) logic 620. The I/O logic 620 may provide the registry scanner component 605 and the port assigner component 610 with the ability to read and store information. For example the I/O logic may provide the ability to read and store information to and from the registry or from additional files. The COM port manager may further comprise a device data structure 615. The device data structure 615 may be used by the registry scanner component 605 and the port assigner 610 for storing COM port assignment requirements and COM port assignment information. The device data structure may include an array of device data components.

Figure 7:
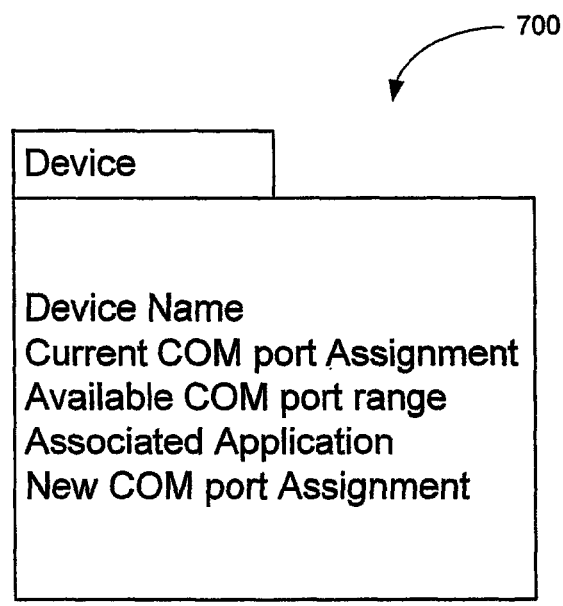
FIG. 7 shows in a schematic an illustrative example of a device data component in accordance with the COM port manager.

FIG. 7 shows in a schematic an illustrative example of a device data component 700. The device data component may store information about COM port assignments and COM port assignment requirements. The device data component 700 is shown as having various variables for storing information. It is understood that these are intended as illustrative variables only. The variables may include:

Device Name: stores the device name

Current COM port assignment: stores the COM port currently assigned to the device Available COM port range: Stores the COM ports that the device may utilize Associated applications: Stores information regarding applications that use the device. This information may include information about the COM ports the application may communicate with. Additionally or alternatively, this information may be used to determine the COM ports the application is capable of communicating with, for example by searching an application COM port assignment file New COM port assignment: Stores the COM port assignment determined by the Port Assigner component.

The COM port manager can be designed to retrieve information relating to the port interfaces of the device as well as the location of the stored system file structure from a file. For example, the COM port manager may be designed to access an extensible markup language (XML) file that comprises a specification of the available port interfaces as well as an indication of the location of the information pertaining to COM port assignments. The COM port manager may then use this information to display and modify COM port assignments of peripheral devices that may be connected to the computer device.

The systems and methods according to the present invention may be implemented by any hardware, software or a combination of hardware and software having the above described functions. The software code, either in its entirety or a part thereof, may be stored in a computer-readable memory. Further, a computer data signal representing the software code which may be embedded in a carrier wave may be transmitted via a communication network. Such a computer-readable memory and a computer data signal are also within the scope of the present patent disclosure, as well as the hardware, software and the combination thereof.

While particular embodiments of the present invention have been shown and described, changes and modifications may be made to such embodiments without departing from the true scope of the invention.

What is claimed is:

1. A method for managing serial communication (COM) ports on a computer device having a system file structure, the method comprising the steps of:

scanning the system file structure of the computer device, the system file structure including information on active devices connected to the computer device using COM port interfaces and information on dynamic devices that may be connected to the computer device using the COM port interfaces;

determining COM port assignments for the active devices connected to the computer device from the information of the active devices stored in a known location in the system file structure;

scanning additional locations in the system file structure for the information on the dynamic devices that may be connected;

determining possible COM port assignments for the dynamic devices that may be connected to the computer device from the information on the dynamic devices stored in the additional locations in the system file structure; and determining COM port requirements for a set of applications that may interact with the active and dynamic devices;

matching the determined COM port requirements for the set of applications with the determined possible COM port assignments to provide a COM port assignment for each of the active and dynamic devices while the dynamic devices are not connected to the COM port interfaces;

displaying the active devices, the dynamic devices and the corresponding determined COM port assignments for the active devices and the determined possible COM port assignments for the dynamic devices.

2. The method as claimed in claim 1, further comprising the steps of:
modifying a displayed COM port assignment of an active device or a dynamic device; and
storing the modified COM port assignment for the active device or the dynamic device in the system file structure.

3. The method as claimed in claim 2, further comprising the steps of:
resolving new COM port assignments for the displayed active and dynamic devices; and
updating the determined COM port assignments for the active and dynamic devices in the system file structure with the resolved new COM port assignments.

4. The method as claimed in claim 3, wherein the system file structure comprises a system registry structure of an operating system of the computer device.

5. The method as claimed in claim 4, wherein the resolved new COM port assignments for the active and dynamic devices are stored as keys and subkeys in the system registry structure.

6. The method as claimed in claim 1, wherein the step of scanning the additional locations in the system file structure comprises the step of first determining the additional locations of the system file structure to scan.

7. The method as claimed in claim 6, wherein the step of determining the additional locations of the system file structure to scan comprises reading the additional locations of the system file structure to scan from a file.

8. The method as claimed in claim 1, wherein the computer device is:
a handheld computer;
a laptop computer;
a desktop computer;
a personal data assistant (PDA); or
a smart phone.

9. A system for managing serial communication (COM) ports on a computer device having a system file structure, the system comprising:
a memory for storing instructions;
a processor for executing the instructions stored in the memory, the executed instructions generating:
a system file structure scanner component for scanning the system file structure and generating device data based on the scanned system file structure, the system file structure including information on active devices connected to the computer device using COM port interfaces and information on dynamic devices that may be connected to the computer device using COM port interfaces, the system file structure scanner component comprising:
an active scanner component for determining COM port assignments for the active devices connected to the computer device from the information on the active devices stored in a known location in the system file structure; and
a dynamic scanner component for determining possible COM port assignments for the dynamic devices that may be connected to the computer device from the information on the dynamic device stored in additional locations in the system file structure;
a device data structure for storing the device data received from the system file structure scanner component; and
a port assigner component for determining COM port requirements for a set of applications that may interact with the active and dynamic devices and matching the determined COM port requirements for the set of applications with the determined possible COM port assignments to provide a COM port assignment for each of the active and dynamic devices while the dynamic devices are not connected to the COM port interfaces, the COM port assigner component further for assigning the COM ports to the active devices and the dynamic devices when connected based on the device data structure.

10. The system as claimed in claim 9, further comprising an input/output component for displaying the determined COM port assignments for the active and dynamic devices, receiving modifications to the determined COM port assignments for the active and dynamic devices and storing the modified COM port assignments for the active and dynamic devices in the system file structure.

11. The system as claimed in claim 9, wherein the port assigner component determines the application COM port requirements from a file.

12. The system as claimed in claim 9, wherein the system file structure comprises a system registry structure of an operating system of the computer device.

13. The system as claimed in claim 12, wherein the COM port assignments for the active and dynamic devices are stored as keys and subkeys in the system registry structure.

14. The system as claimed in claim 9, wherein the computer device is:
a handheld computer;
a laptop computer;
a desktop computer;
a personal data assistant (PDA); or
a smart phone.

15. A computer-readable medium storing instructions or statements for use in the execution in a computer device of a method of managing serial communication (COM) ports on the computer device, the method comprising the steps of:
scanning a system file structure of the computer device, the system file structure including information on active devices connected to the computer device using COM port interfaces and information on dynamic devices that may be connected to the computer device using COM port interfaces;

determining COM port assignments for the active devices connected to the computer device from the information of the active devices stored in a known location in the system file structure;

scanning additional locations in the system file structure for the information on the dynamic devices that may be connected;

determining possible COM port assignments for the dynamic devices that may be connected to the computer device from the information on the dynamic devices stored in the additional locations in the system file structure;

determining COM port requirements for a set of applications that may interact with the active and dynamic devices;

matching the determined COM port requirements for the set of applications with the determined possible COM port assignments to provide a COM port assignment for each of the active and dynamic devices while the dynamic devices are not connected to the COM port interfaces; and displaying the active devices, the dynamic devices and the corresponding determined COM port assignments for the active devices and the determined possible COM port assignments for the dynamic devices.

16. The computer-readable medium as claimed in claim 15, further comprising the steps of:

modifying a displayed COM port assignment of an active device or a dynamic device; and storing the modified COM port assignment for the active device or the dynamic device in the system file structure.

17. The computer-readable medium as claimed in claim 16, further comprising the steps of:

resolving new COM port assignments for the displayed active and dynamic devices; and updating the determined COM port assignments for the active and dynamic devices in the system file structure with the resolved new COM port assignments.

* * * * *